F. J. MESSMAN.
AUTOMATIC COFFEE AND CREAM URN AND FAUCET.
APPLICATION FILED FEB. 28, 1921.
1,413,755.
Patented Apr. 25, 1922.
2 SHEETS—SHEET 1.
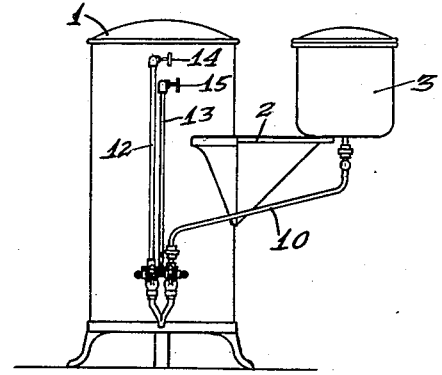
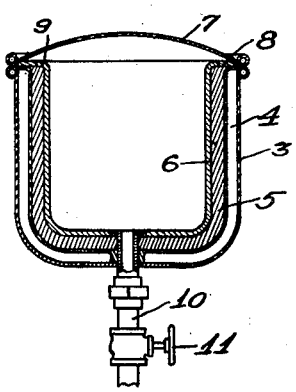
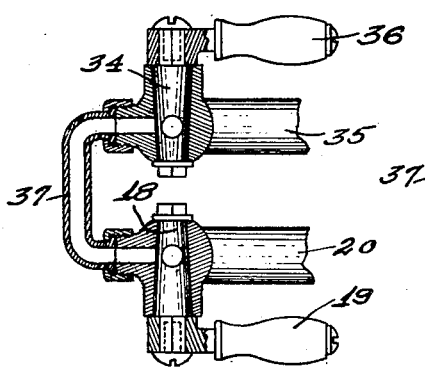
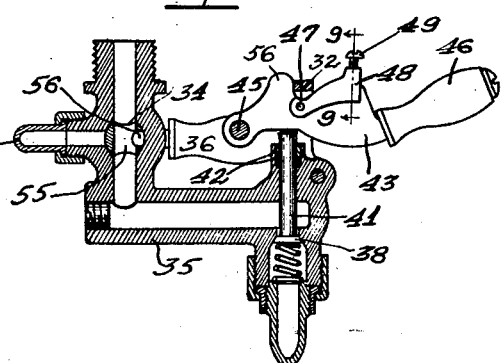
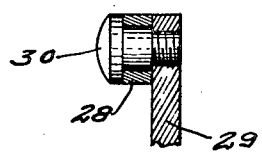
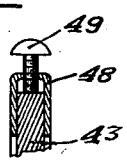

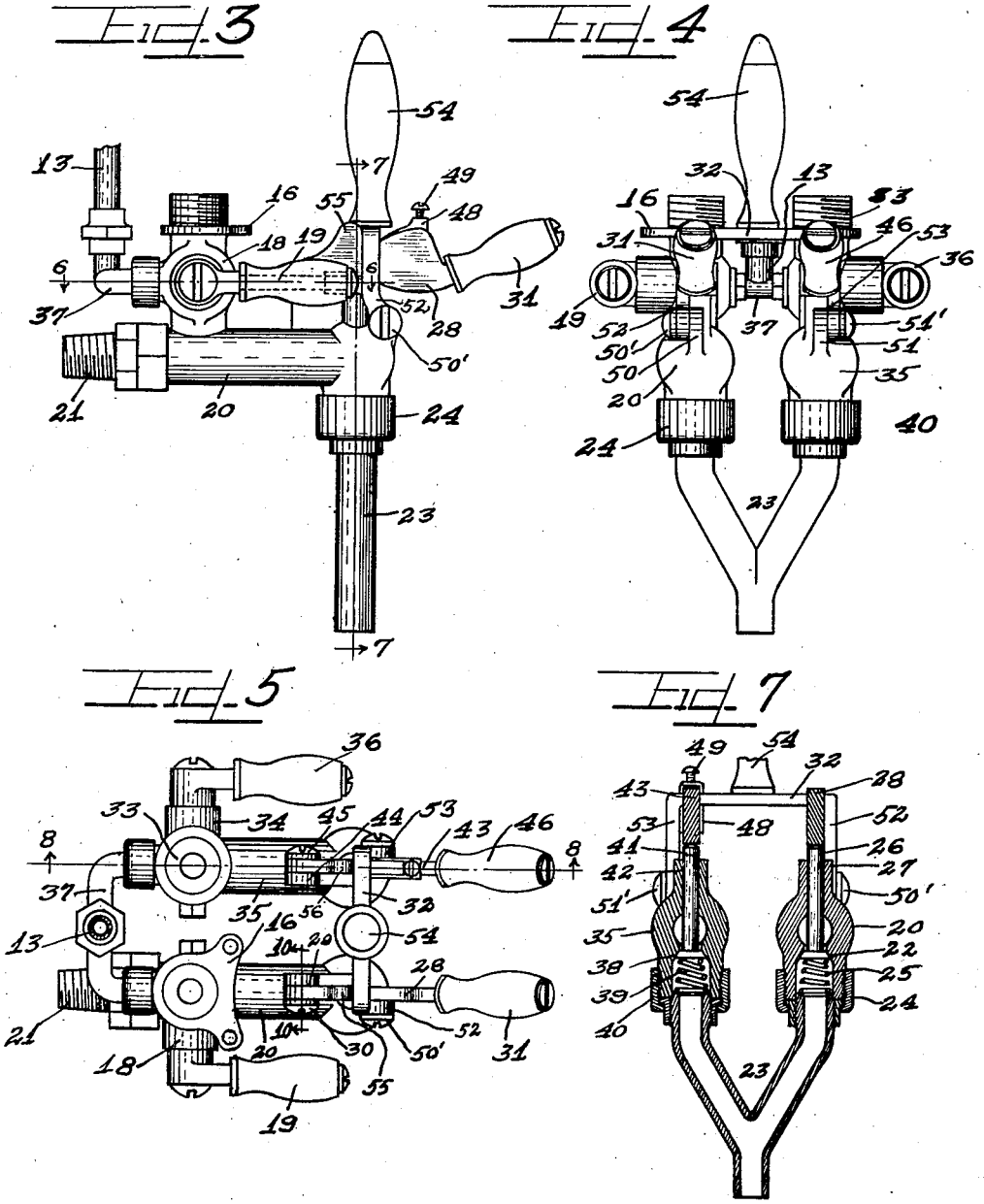

UNITED STATES PATENT OFFICE.

FREDERICK J. MESSMAN, OF CHICAGO, ILLINOIS.

AUTOMATIC COFFEE AND CREAM URN AND FAUCET.

1,413,755.         Specification of Letters Patent.     Patented Apr. 25, 1922.

Application filed February 28, 1921. Serial No. 448,499.

*To all whom it may concern:*

Be it known that I, FREDERICK J. MESSMAN, a citizen of the United States, and a resident of the city of Chicago, in the county of Cook and State of Illinois, have invented certain new and useful Improvements in an Automatic Coffee and Cream Urn and Faucet; and I do hereby declare that the following is a full, clear, and exact description of the same, reference being had to the accompanying drawings, and to the numerals of reference marked thereon, which form a part of this specification.

This invention concerns a dispensing apparatus for coffee and cream.

It is an object of this invention to provide a means whereby the operator may deliver a cup of black coffee or a cup of coffee in which a fixed amount of cream is mingled or a cup in which a different amount of cream is mingled.

It is a further object of this invention to provide a means whereby the amount of cream to be mingled with the coffee in the standard cup is fixed by an adjustment.

It is a further object of this invention to provide a dispensing faucet with three handles, one which controls the flow of coffee, one the flow of cream, and one the flow of standard mixture.

It is a further object of this invention to provide means whereby such an apparatus may be readily kept in a clean and sanitary condition.

Other and further important objects of this invention will be apparent from the disclosures in the drawings and specification.

The invention (in a preferred form) is illustrated in the drawings and hereinafter more fully described.

On the drawings:

Figure 1 is a front view of the coffee and cream urn.

Figure 2 is a sectional view of the cream receptacle.

Figure 3 is a side view of the faucet.

Figure 4 is a front view of the faucet.

Figure 5 is a top plan view of the faucet.

Figure 6 is a section upon the line 6—6 of Figure 3.

Figure 7 is a section upon the line 7—7 of Figure 3.

Figure 8 is a section upon the line 8—8 of Figure 5.

Figure 9 is a section upon the line 9—9 of Figure 8.

Figure 10 is a section upon the line 10—10 of Figure 5.

As shown on the drawings:

The coffee receptacle 1 is of the usual form and is surrounded by a steam jacket, from the side of which extends a bracket 2 supporting the cream receptacle 3. This receptacle is surrounded by a dead air space 4 and a layer of cork 5. Inside of the cork is the usual vessel of metal coated with enamel 6. A cover 7 is provided with a flange 8 of cork fitted around the upper edge of the receptacle 6. This edge extends outward as shown at 9 to rest upon the upper edge of the layer 5 of cork. The flange 8 of cork closely surrounds the turned out portion 9 of the vessel. From the bottom goes a pipe 10 controlled by a valve 11.

The coffee receptacle is provided with a sight glass 12, near which is a pipe 13 fed from the steam jacket. The sight glass and the steam pipe are controlled at their upper ends by the valves 14 and 15 respectively. The lower end of the sight glass 12 has the usual flanged fixture 16, from which there is a passage downward through the valve 18 controlled by the handle 19 into the pipe 20. This pipe is threaded at the end 21 for connection with the coffee receptacle. When the valve 18 is in the position illustrated in Figure 6, coffee will flow from the receptacle 1 into the sight glass 12 until the level in the sight glass agrees with the level in the receptacle.

The other end of the pipe 20 is controlled by a valve 22 and leads into one branch of the Y 23. A union 24 is employed to secure this branch of the Y 23 to the outlet of the pipe 20. A spring 25 serves to hold the valve 22 against its seat. The lower end of this spring bears against the end of the branch of the Y and the upper end of the spring bears against the valve. The valve has a stem 26, which extends up through and is guided by a boss 27 upon the upper side of the pipe 20.

The stem 26 contacts with a lever 28 mounted upon the upper side of the pipe 20. This mounting is by means of a lug 29, through which and the end of the lever goes a screw 30. The other end of the lever has a handle 31 by which it may be pulled down to open the valve 22. The upward motion of this lever is limited by its contact with a yoke 32.

Side of the fixture 16 is a union 33 for the pipe 10 coming from the cream reservoir 3. From this union 33 the cream can pass, when the valve 34 is in the position shown in Figure 6, into the pipe 35. The valve 34 is operated by a handle 36, which lies opposite the handle 19. The rear side of the valves 18 and 34 are connected by a pipe 37, into which the pipe 13 enters, bringing steam from the steam chest. With the valves in the position shown in Figure 6, this steam does not get beyond the valves 34 and 18, but, as will be explained below, when these valves are manipulated, the steam may pass into the pipes 20 and 35 or into the pipe 10 and the sight glass 12.

The forward end of the pipe 35 is controlled by a valve 38, having a spring 39 and is united by a union 40 to the other branch of the Y 23. The valve has a stem 41 going through a boss 42 and contacting with a lever 43, each of these parts being like the corresponding parts for the pipe 20, as is illustrated in Figure 7. The upward motion of the lever 43, like that of the lever 28, is limited by the yoke 32. The limitation is, however, adjustable as will be explained below. The lever 43 is pivoted to a lug 44 by a screw 45 on the pipe 35 in a way similar to the lever 28, as shown in Figure 5. The forward end of the lever 43 has a handle 46.

Pivoted to the lever 43 at a point 47 between its ends is a stirrup-like member 48. The height of this member above the lever 43 is regulated by a screw 49, which goes through the member 48 and contacts with the lever 43. The member 48 stands up above the level of the upper edge of the lever 28, so that its contact with the yoke 32 will tend to lower the lever 43, sooner than the lever 28 is lowered. This relation between the lever 28 and member 48 may be seen in Figure 3.

The yoke 32 consists of a cross piece and two upstanding parts. The upstanding parts are shown at 52 and 53 respectively. The part 52 is pivoted on the outer end of the pipe 20 to a lug 50 by means of a screw 50', and the part 53 is pivoted to a lug 51 on the outer end of the pipe 35 by means of a screw 51'. A handle 54 is attached at the central part of the cross-piece to serve to manipulate the yoke. An upstanding lug 55 upon the lever 28 and an upstanding lug 56 upon the lever 43 serve to limit the motion of the yoke 32 toward the rear. When the yoke is pulled forward by means of the handle 54 it contacts with a cam surface upon the upper edge of the lever 28, and with the edge of the stirrup 48 upon the lever 43, causing these levers to be depressed to open the valves 22 and 38.

The valve 34 is shown in section in Figure 8 in the position corresponding to that illustrated in Figure 6. As clearly seen from this section, the valve has one bore 55 completely through the plug and another bore 56 at right angles thereto extending half way through only. The latter bore is parallel to and in the same direction as the handle. The bore 55 is at right angles to the handle. The valve 18 is of similar construction and a sectional view thereof would be like that of the valve 34.

When the valves are in the position illustrated with the handles horizontal, the valve 34 affords connection between the pipe 10 and the pipe 35 by means of its bore 55. When the handle 36 is moved upward into a vertical position, the valve 34 will afford communication between the pipe 37 and the pipe 10 by means of the bore 55 and the half bore 56. When the handle 36 is moved downward to a vertical position, the valve 34 will afford communication between the pipe 37 and the pipe 35 by means of the bore 55 and the half bore 56. Similarly, when the handle 19 is in the illustrated position, communication is had between the sight glass 12 and the pipe 20. When the handle 19 is moved upward to a vertical position, communication is had between the pipe 37 and the sight glass, and when the handle 19 is moved downward to a vertical position, communication is had between the pipe 37 and the pipe 20.

The operation is as follows:
With the valves 34 and 18 in the position illustrated in Figure 6, and the valve 11 open, the operator pulls the handle 54 forward. The yoke 32 consequently contacts with the lever 28 and with the member 48 upon the lever 43. As a result the valves 22 and 38 are opened. The valve 22 is opened to a standard extent. The valve 38 is opened to an extent depending on the adjustment of the stirrup 48 by means of the screw 49. As a result of opening these valves, coffee flows from the coffee receptacle 1 through the pipe 20 and valve 22, and at the same time cream flows from the cream receptacle 3 through the pipe 10, the valve 34, the pipe 35 and the valve 38. Consequently coffee is delivered through one branch of the Y 23 and cream through the other branch thereof. The two mingle and emerge from the Y 23 into the cup which the operator places below the mouth of this Y.

The quantity of cream delivered by this flow during the time that the combined stream is filling the cup will depend upon the adjustment of the stirrup 48. This adjustment is fixed at the beginning of the use of the device by the management of the house using the dispenser so that the valve 38 will be open to the extent necessary to deliver the quantity of cream required for the mixture of cream and coffee which the house regards as a proper standard for its business.

When the cup is nearly full, the operator returns the handle 54 to its vertical position and the springs 25 and 39 return the valves 22 and 38 to their closed positions. The coffee remaining in one branch of the Y and the cream remaining in the other branch of the Y then mingle and flow out together completing the filling of the cup. There is consequently no remaining drop or drops of cream to get away and be wasted. If the cup is removed from below the mouth of the Y before the flow is entirely completed, the waste will consist not of cream, but of a mixture of cream and coffee, and the mixture is much less expensive than the cream.

If it is desired to deliver a cup of coffee without any cream, the operator depresses the handle 31 instead of the handle 54, with the result that only the valve 22 is opened and the flow is that of coffee alone. If it is desired to deliver a cup of coffee with more than the standard amount of cream therein, the operator depresses the handle 46. This will open the valve 38 and cause the flow of cream without any coffee therein to pass out of the Y. When the desired extra amount of cream has been delivered, the operator will release the handle 46 and open the two valves by pulling the handle 54. The portion of the cup not already filled with cream will then be filled with standard mixture of cream and coffee and the resulting cup will have a larger proportion of cream than the standard mixture. The operator may, if he desires, pull the handle 54 at the beginning of the operation of filling a cup with a mixture containing more than the desired amount of cream. This operation depresses the handle 46 but not to its full travel. The operator may, therefor, further depress the handle 46 at the same time, thus opening the valve 38 wider than the standard opening. This will also result in delivering a mixture with more than the standard amount of cream. The handles 54 and 46 are so positioned that the operator may close his fingers around the handle 54 and bring the fleshy part of his hand or the end of his wrist against the handle 46, thus performing both operations with one motion of the hand.

To facilitate the ready selection of the proper handle for each of these operations, the three handles are colored to correspond to the liquids which they deliver. The handle 31 should be black or dark to indicate that it controls the flow of coffee without any cream mixed therewith. The handle 46 should be light colored or white to indicate that it controls the flow of cream, and the handle 54 should be of an intermediate shade or of the color of coffee with cream mixed therein to indicate that it controls the flow of mixture. The use of the device in the hands of an experienced operator is thus facilitated and mistakes are prevented by such choice of colors.

When it is desired to clean the device, steam from the steam jacket may be passed through each of the parts to thoroughly cleanse and sterilize the same. To pass steam through the pipe 10 and cream receptacle 3, the handle 36 is moved to a vertically upward position. The valve 15 is then opened. This permits steam to pass down the pipe 13 into the pipe 37 through the valve 34 upward into the pipe 10; through the pipe 10 into the chamber 6 of the cream receptacle, and from there out, the cover 7 having been removed for this purpose. Such a flow of steam may be continued until the parts are thoroughly sterilized and cleaned. When the handle 36 is moved to a vertically downward position with the valve 15 still open, steam flows down the pipe 13, through the pipe 37 to the valve 34 and from thence into the pipe 35. By depressing the handle 46, this steam may be permitted to continue its flow through the valve 38 and one branch of the Y 23. These parts may thus be cleaned and sterilized.

With the handle 36 in illustrated position and the handle 19 moved to a vertical upright position and the valve 15 still open, steam will pass down the pipe 13, through the pipe 37 into the valve 18 and from thence upward into the sight glass. This may thus be cleansed in its turn. To permit the steam to flow completely through the sight glass, the valve 14 must also be opened. When the handle 19 is moved downwardly to a vertical position with the other valves as already described, steam will flow through the pipe 37 to the valve 18 and thence into the pipe 20. If then the handle 31 is depressed, steam will flow through the valve 22 and through the other half of the Y 23 cleansing and sterilizing these parts.

The Y 23 at the forward end of the pipes 35 and 20, and the pipe 37 at the rear end of the same pair hold each end of this pair of pipes at the required distance so that in the assembly of the device by means of the several unions the parts will not readily get out of alignment and the assembly is thus facilitated. Moreover, almost all the projecting parts are on the outside of the rectangle formed by these pipes, so that the interior of this rectangle is easily accessible for cleansing and polishing.

I am aware that numerous details of construction may be varied through a wide range without departing from the principles of this invention, and I therefore do not purpose limiting the patent granted otherwise than necessitated by the prior art.

I claim as my invention:

1. A coffee urn comprising a receptacle for coffee, a receptacle for cream, a delivery pipe, and means for connecting said delivery pipe to either or to both of said receptacles, said means including an adjustable device for limiting the effective size of the connection to the cream receptacle when both connections are made.

2. In a fluid dispensing device, two valves, means for opening either valve, means for opening both valves simultaneously, a device for controlling the ratio of the opening of the second valve to the opening of the first, and means for adjusting said device to change said ratio.

3. In a dispensing device, two valves, two handles, one for each valve, connections between each of the handles and its respective valve whereby either valve may be opened by operating its handle, a third handle, means whereby operation of the third handle opens both valves, and means to vary the degree to which the third handle when operated opens one of said valves.

4. In a faucet, a valve, a lever for opening said valve, a cam on said lever, an operating member contacting with said cam, means for moving said lever independently of said operating member to open said valve, and means for moving said operating member to move said lever to open said valve.

5. A valve, a lever for opening said valve, an operating member which when moved, moves said lever, the full travel of said operating member being independent of the extent of movement of said lever and means whereby the extent of the movement of said lever produced by said operating member may be adjusted.

6. A valve, a spring acting to seat said valve, a lever for opening said valve, a handle on said lever, a second handle, means including a cam for moving said lever when said second handle is moved to thereby open the valve, and an adjustable member for changing the effective shape of said cam to change the degree the valve is opened by the movement of the second handle.

7. A double faucet, a yoke pivoted thereto, a pair of valves, one for each element of the faucet, a spring for each valve, a lever for each valve, a cam on one of said levers contacting with said yoke whereby movement of said yoke will move said lever to open its valve, a member pivoted to the other lever and contacting with the yoke to act as a cam whereby movement of the yoke will move the second lever an amount determined by the position of said member to open its valve a corresponding degree, and means for adjusting the member about its pivot.

8. In a coffee urn, a coffee receptacle, a steam jacket surrounding the same, a cream receptacle, a heat insulating jacket surrounding the latter, a dispensing faucet, piping and valves whereby said faucet may be connected to deliver coffee or cream or a predetermined mixture of the two, and valve controlled connections from the steam jacket to said cream receptacle and to said faucet whereby steam may be directed through any of said parts at will.

9. In a coffee urn, a sight glass, a faucet, a coffee receptacle, a steam jacket surrounding the same, connections between the faucet and coffee receptacle, a three way valve and connections thereto whereby steam from the steam jacket may be directed at will into said sight glass or into said faucet.

In testimony whereof I have hereunto subscribed my name in the presence of two subscribing witnesses.

FREDERICK J. MESSMAN.

Witnesses:
CARLTON HILL,
JAMES M. O'BRIEN.